United States Patent
Kaneko et al.

(10) Patent No.: US 8,711,311 B2
(45) Date of Patent: Apr. 29, 2014

(54) FRINGE FIELD SWITCHING MODE LIQUID CRYSTAL DISPLAY PANEL

(75) Inventors: Hideki Kaneko, Azumino (JP); Masahiro Horiguchi, Azumino (JP)

(73) Assignee: Japan Display West Inc., Aichi-Ken ( * ) Notice: Subject to any disclaimer, the term of this patent is extended or adjusted under 35 U.S.C. 154(b) by 964 days.

(21) Appl. No.: 11/727,005

(22) Filed: Mar. 23, 2007

(65) Prior Publication Data

US 2007/0229749 A1 Oct. 4, 2007

(30) Foreign Application Priority Data

Mar. 28, 2006 (JP) .................................. 2006-088208

(51) Int. Cl.
*G02F 1/1343* (2006.01)
(52) U.S. Cl.
USPC .......................................................... 349/141
(58) Field of Classification Search
USPC .......................................................... 349/141
See application file for complete search history.

(56) References Cited

U.S. PATENT DOCUMENTS

| | | | |
|---|---|---|---|
| 5,760,857 A * | 6/1998 | Yanagawa et al. | 349/43 |
| 6,172,729 B1 | 1/2001 | Ikeda | |
| 6,646,707 B2 | 11/2003 | Noh et al. | |
| 2002/0041354 A1* | 4/2002 | Noh et al. | 349/141 |
| 2002/0180920 A1* | 12/2002 | Noh et al. | 349/141 |
| 2005/0140891 A1 | 6/2005 | Fujiioka et al. | |
| 2005/0264744 A1* | 12/2005 | Kim et al. | 349/141 |
| 2005/0286003 A1* | 12/2005 | Lee et al. | 349/141 |
| 2007/0002247 A1* | 1/2007 | Lee | 349/141 |

FOREIGN PATENT DOCUMENTS

| | | |
|---|---|---|
| JP | 2000-131720 A | 5/2000 |
| JP | 2002-14363 A | 1/2002 |
| JP | 2002-182230 A | 6/2002 |
| JP | 2002-244158 A | 8/2002 |
| JP | 2003-322869 A | 11/2003 |
| JP | 2005-189614 A | 7/2005 |
| JP | 2005-338256 A | 12/2005 |
| KR | 10-2002-0010209 A | 2/2002 |
| KR | 10-2004-0011682 A | 2/2004 |

OTHER PUBLICATIONS

Korean Office Action dated Dec. 21, 2007 (mailing date), issued in corresponding Korean Patent Application No. 10-2007-0022602.

* cited by examiner

*Primary Examiner* — Lauren Nguyen
(74) *Attorney, Agent, or Firm* — K&L Gates LLP

(57) ABSTRACT

The present invention provides a fringe field switching (FFS) mode liquid crystal display panel including a plurality of scanning lines 12 and common lines 13 provided in parallel, a plurality of signal lines 14 provided in a crank manner in a direction perpendicular to the scanning lines 12, and pixel electrodes $18_1$ and $18_2$ each formed between the plurality of scanning lines 12 and signal lines 14 in a delta arrangement. Each of the pixel electrodes $18_1$ and $18_2$ has a plurality of slits $17_1$ and $17_2$, respectively, inclined in different directions to each other with respect to an axis x parallel to the scanning lines 12 and positioned between adjacent scanning lines 12. The pixel electrodes $18_1$ in odd-numbered rows and the pixel electrodes $18_2$ in even-numbered rows are inverted to each other with respect to another axis perpendicular to the axis x. With such features, the FFS mode liquid crystal display panel provides symmetrical viewing angle generating no spots in a transverse direction, a wide viewing angle, a bright display with high transmittance and excellent display quality.

10 Claims, 17 Drawing Sheets

70D  PRIOR ART

FRINGE FIELD SWITCHING MODE LIQUID CRYSTAL DISPLAY PANEL

BACKGROUND

1. Technical Field

The present invention relates to a fringe field switching (hereinafter, referred to as "FFS") mode liquid crystal display (LCD) panel. More particularly, the present invention relates to an FFS mode LCD panel in a dual-domain structure in which pixels are arranged in a delta arrangement.

2. Related Art

In recent years, LCD panels are widely used not only for information and communication devices but also for electrical devices in general. Typical LCD panels include one pair of substrates made of glass and the like formed with electrodes and the like on their surfaces, and a liquid crystal layer formed between the pair of substrates. By applying a voltage to the electrodes on both substrates to change transmittance of light by rearranging liquid crystal molecules, various images are displayed. This is a so-called longitudinal electric field mode. There are a twisted nematic (TN) mode and a vertical alignment (VA) mode in a longitudinal electric field mode LCD panel. But, as there is a problem of a narrow viewing angle, various improved longitudinal electric field mode LCD panels such as a multidomain vertical alignment (MVA) mode have been developed.

Unlike the above longitudinal electric field mode LCD panel, an LCD panel including electrodes only on one of the substrates, which may be called a transverse electric field mode, is known as an in-plane switching (IPS) mode LCD panel (refer to JP-A-2005-338256). An operational principle of the IPS mode LCD panel will be described with reference to FIGS. 11 and 12. FIG. 11 is a schematic plan view of one pixel of the IPS mode LCD panel, and FIG. 12 is a schematic sectional view taken along the line XII-XII of FIG. 11.

An IPS mode LCD panel 50 includes an array substrate AR and a color filter substrate CF. The array substrate AR is provided with a plurality of scanning lines 52 and common lines 53 in parallel on a surface of a first transparent substrate 51. A plurality of signal lines 54 are provided in a direction perpendicular to the scanning lines 52 and the common lines 53. In a central part of each pixel, a strip of common electrode 55 is provided from the common line 53, in an inverted T-shape as in FIG. 11. A pixel electrode 56 is provided so as to surround the periphery of the common electrode 55.

A thin film transistor (TFT) serving as a switching element is formed between the scanning line 52 and the signal line 54. The TFT is disposed with a semiconductor layer 57 between the scanning line 52 and the signal line 54. A portion of the signal line on the semiconductor layer 57 forms a source electrode S, a portion of the scanning line under the semiconductor layer 57 forms a gate electrode G, and a portion of the pixel electrode 56 overlapping with a part of the semiconductor layer 57 forms a drain electrode D.

The color filter substrate CF includes a color filter layer 59 on a surface of a second transparent substrate 58. The array substrate AR is disposed to face the color filter substrate CF, so as the pixel electrode 56 and the common electrode 55 of the array substrate AR, and the color filter layer 59 of the color filter substrate CF are opposed to each other. A liquid crystal LC is sealed therebetween. By respectively disposing polarizers 60 and 61 at outer sides of both substrates, so that their polarizing directions are perpendicular to each other, the IPS mode LCD panel 50 is formed.

According to the IPS mode LCD panel 50, as shown in FIG. 12, when an electric field is formed between the pixel electrode 56 and the common electrode 55, liquid crystal molecules aligned in a horizontal direction revolve in a horizontal direction. This enables the amount of transmitting light entering from a backlight to be controlled. The IPS mode LCD panel 50 has a wide viewing angle and high contrast. Furthermore, because the pixel electrode 56 and the common electrode 55 are disposed with a relatively narrow space therebetween, it has an advantage of secondarily generating a storage capacitance. But, because the common electrode 55 is formed of the same metal material as the common line 53, there are problems of a low aperture ratio and a low transmittance, and color changes depending on viewing angle.

In order to solve the problems of the low aperture ratio and the low transmittance of the IPS mode LCD panel, an FFS mode LCD device which may be called an inclined electric field system has been developed (refer to JP-A-2000-131720, JP-A-2002-14363 and JP-A-2002-244158). An operational principle of such a FFS mode LCD panel will be described with reference to FIGS. 13 and 14. FIG. 13 is a schematic plan view of one pixel of an FFS mode LCD panel, and FIG. 14 is a schematic sectional view taken along the line XIV-XIV of FIG. 13.

An FFS mode LCD panel 70A includes an array substrate AR and a color filter substrate CF. The array substrate AR is provided with a plurality of scanning lines 72 and common lines 73 in parallel on a surface of a first transparent substrate 71. A plurality of signal lines 74 are provided in a direction perpendicular to the scanning lines 72 and the common lines 73. A common electrode 75 made of a transparent material such as indium tin oxide (ITO), which is connected to the common line 73, is provided so as to cover an entire surface of each pixel. A pixel electrode 78A made of a transparent material such as ITO, which is formed with a plurality of slits 77A in stripes, is provided on a surface of the common electrode 75 with an insulating film 76 therebetween.

A TFT serving as a switching element is formed near an intersection of the scanning line 72 and the signal line 74. The TFT is disposed with a semiconductor layer 79 on a surface of the scanning line 72. A part of the signal line 74 is extended to cover a part of a surface of the semiconductor layer 79, thereby forming a source electrode S of the TFT. A portion of the scanning line under the semiconductor layer 79 forms a gate electrode G, and a portion of the pixel electrode 78A overlapping with a part of the semiconductor layer 79 forms a drain electrode D.

The color filter substrate CF includes a color filter layer 81 on a surface of a second transparent substrate 80. The array substrate AR is disposed to face the color filter substrate CF, so as the pixel electrode 78A and the common electrode 75 of the array substrate AR, and the color filter layer 81 of the color filter substrate CF are opposed to each other. A liquid crystal LC is sealed therebetween. By respectively disposing polarizers 82 and 83 at outer sides of both substrates, so that their polarizing directions are perpendicular to each other, the FFS mode LCD panel 70A is formed.

According to the FFS mode LCD panel 70A, when an electric field is formed between the pixel electrode 78A and the common electrode 75, as shown in FIG. 14, the electric field moves toward the common electrode 75 from both sides of the pixel electrodes 78A. This allows not only liquid crystal molecules existing between the pixel electrodes 78A but also liquid crystal molecules existing above the pixel electrodes 78A to move. Therefore, the FFS mode LCD panel 70A has a wider viewing angle and higher contrast than the IPS mode LCD panel 50, and allows a bright display because of its high transmittance. In addition, the FFS mode LCD panel 70A has an advantage of secondarily generating a larger storage capacitance, because the overlapping area between the pixel electrode 78A and the common electrode 75 is larger than that in the IPS mode LCD panel 50 in plan view, thereby eliminating a need to provide an auxiliary capacitor line separately.

According to the FFS mode LCD panel, in the same manner as the IPS mode LCD panel disclosed in JP-A-2005-338256, due to its display characteristics, a rubbing direction is preferably perpendicular to the signal lines, and a minimum inclined angle is preferably provided between the pixel electrodes and the rubbing direction. Therefore, as an FFS mode LCD panel 70B shown in FIG. 15, slits 77B in stripes provided to a pixel electrode 78B are inclined toward the scanning line 72 or the common line 73. Similarly, in order to eliminate changes in color depending on viewing angle, as an FFS mode LCD panel 70C shown in FIG. 16, a dual-domain approach has been adopted by disposing slits 77C in stripes provided to a pixel electrode 78C in a V-shape. The only difference between the FFS mode LCD panels 70B and 70C shown in FIGS. 15 and 16, and the FFS mode LCD panel 70A shown in FIG. 13, is the inclination of the slits 77B or 77C provided to the pixel electrode 78B or 78C. The same components of the panels 70B and 70C as in the panel 70A shown in FIG. 13 are denoted by the same reference numerals, and descriptions thereof are omitted.

As described above, FFS mode LCD panels have a wider viewing angle and higher contrast than IPS mode LCD panels, and allow a bright display because of their high transmittance. As they can operate at low voltage and secondarily generate a larger storage capacitance, their display quality is excellent even when an auxiliary capacitor line is not provided separately. In the FFS mode LCD panels disclosed in JP-A-2000-131720, JP-A-2002-14363 and JP-A-2002-244158, pixels are aligned in a row direction and a column direction, and generally used in combination with color filers arranged in stripes or color filters arranged in diagonal rows. When they are used mainly for displaying images taken by a digital still camera and the like, a delta arrangement (also referred to as "triangle arrangement"), in which pixels are arranged alternatively, may be used.

According to these FFS mode LCD panels in which pixels are arranged in the delta arrangement, the shape of the slits is preferably formed in the same shape at every pixel electrode in order to reduce display unevenness. However, the signal lines need to be arranged in a direction perpendicular to the scanning lines, although in a crank manner, by shortening the wiring length. As a result, the TFTs are positioned differently depending on whether they are in odd-numbered or even-numbered rows. Such a state will be described with reference to FIG. 17. FIG. 17 is a schematic plan view of several pixels of an FFS mode LCD panel 70D in which pixels are arranged in a delta arrangement. The view shows a pixel electrode 78D and slits 77D provided at the pixel electrode 78D only, omitting other specific features. In FIG. 17, broken lines between the pixels show a boundary of each pixel, and solid lines show a path of the signal line. A portion enclosed within a broken line circle shows a position where the TFT of each pixel is provided.

In the FFS mode LCD panel 70D shown in FIG. 17, the TFTs of the pixels in odd-numbered rows are positioned at the lower right-hand side of the view, while the TFTs of the pixels in even-numbered rows are positioned at the lower left-hand side of the view, whereby the signal lines can be arranged linearly in a longitudinal direction, although in a crank manner, with a short wiring length. In the FFS mode LCD panel 70D, the shape of slits provided to each pixel electrode of the pixels in odd-numbered row are formed in an optimum shape to utilize a display opening effectively. But, the shape of the slits provided to each pixel electrode in even-numbered rows at a position shown by the X-mark in the view is different from that of odd-numbered rows. As they cannot form into the same shape, a symmetrical viewing angle cannot be obtained. As a result, when the FFS mode LCD panel 70D displays an image, spots are generated in a transverse direction. On the other hand, when the shape of the slits of the pixel electrode of each pixel is made into the same shape both in odd-numbered and even-numbered rows, the display opening cannot be effectively utilized. The same phenomenon occurs to FFS mode LCD panels having slits provided to the pixel electrodes in a dual-domain structure and pixels provided in a delta arrangement.

SUMMARY

In consideration of the problems with FFS mode LCD panels having slits provided to pixel electrodes in a dual-domain structure and pixels provided in a delta arrangement as described above, the present invention provides an FFS mode LCD panel having symmetrical viewing angle without generating spots in a transverse direction. It also has a wide viewing angle, allows a bright display with its high transmittance and excellent display quality.

To obtain the above advantage, an FFS mode LCD panel of the present invention includes a plurality of scanning lines and common lines provided in parallel, a plurality of signal lines provided in a crank manner in a direction perpendicular to the scanning lines, and a plurality of pixel electrodes each formed between the plurality of scanning lines and signal lines in a delta arrangement. Each of the plurality of pixel electrodes includes portions defining a plurality of slits inclined in different directions to each other with respect to an axis parallel to the scanning lines and positioned between adjacent scanning lines. Among the pixel electrodes, pixel electrodes in odd-numbered rows and pixel electrodes in even-numbered rows are inverted to each other with respect to an axis perpendicular to the scanning lines.

In the above FFS mode LCD panel, the slits provided at both sides of the axis parallel to the scanning lines may be the same in number on both sides.

In the above FFS mode LCD panel, the common lines may be provided under the pixel electrodes with respect to the axis parallel to the scanning lines.

In the above FFS mode LCD panel, ends of the slits that are on both sides of and closest to the axis parallel to the scanning lines may be coupled on the axis parallel to the scanning lines.

By providing the features stated above, the present invention offers beneficial advantages as described below. With the above FFS mode LCD panel, while switching elements, such as TFTs to operate the pixel electrodes are positioned differently depending on whether they are in odd-numbered or even-numbered rows, the length of the signal lines can be shortened. Further, the slits provided at the pixel electrodes of each pixel are symmetric with respect to an axis parallel to the scanning lines, while keeping dead space at a minimum. Furthermore, the slits are symmetric by each row with respect to another axis perpendicular to the scanning lines. This makes it possible to maintain symmetrical viewing angle in both directions parallel and perpendicular to the scanning lines, utilizing a display opening. Also, no spots are generated in a transverse direction as in the related art, and an FFS mode LCD panel with a bright display can be obtained.

Furthermore, as the slits of the pixel electrodes provided at both sides of the axis parallel to the scanning lines are the same in number, the shape of the pixel electrodes is near-perfectly symmetric with respect to the axis parallel to the scanning lines within one pixel. This enhances symmetrical viewing angle in a direction perpendicular to the scanning lines, whereby an FFS mode LCD panel with a wider viewing angle and excellent display quality can be obtained.

Furthermore, as the common lines are not transparent as they are generally made of the same conductive material as the scanning lines, the common lines can shield a disclination portion generated at a position where the slits inclined in different directions are adjacent to each other. Therefore, an FFS mode LCD panel with excellent display quality can be obtained.

Furthermore, by coupling ends of the slits that are on both sides of and closest to the axis parallel to the scanning lines, an area of each pixel electrode can be utilized effectively. As the generation of disclination near the coupling point of both slits is suppressed, an FFS mode LCD panel with excellent display quality can be obtained.

DESCRIPTION OF THE PREFERRED EMBODIMENTS

Hereinafter, preferred embodiments of the present invention will be described with reference to the drawings. The following embodiments are examples to show features of an FFS mode LCD panel, in order of manufacturing steps, to embody the concept of the present invention. The present invention is not intended to be specified to this FFS mode LCD panel, and may be equally applied to other embodiments not departing from the spirit and scope of the appended claims.

Figure 1:
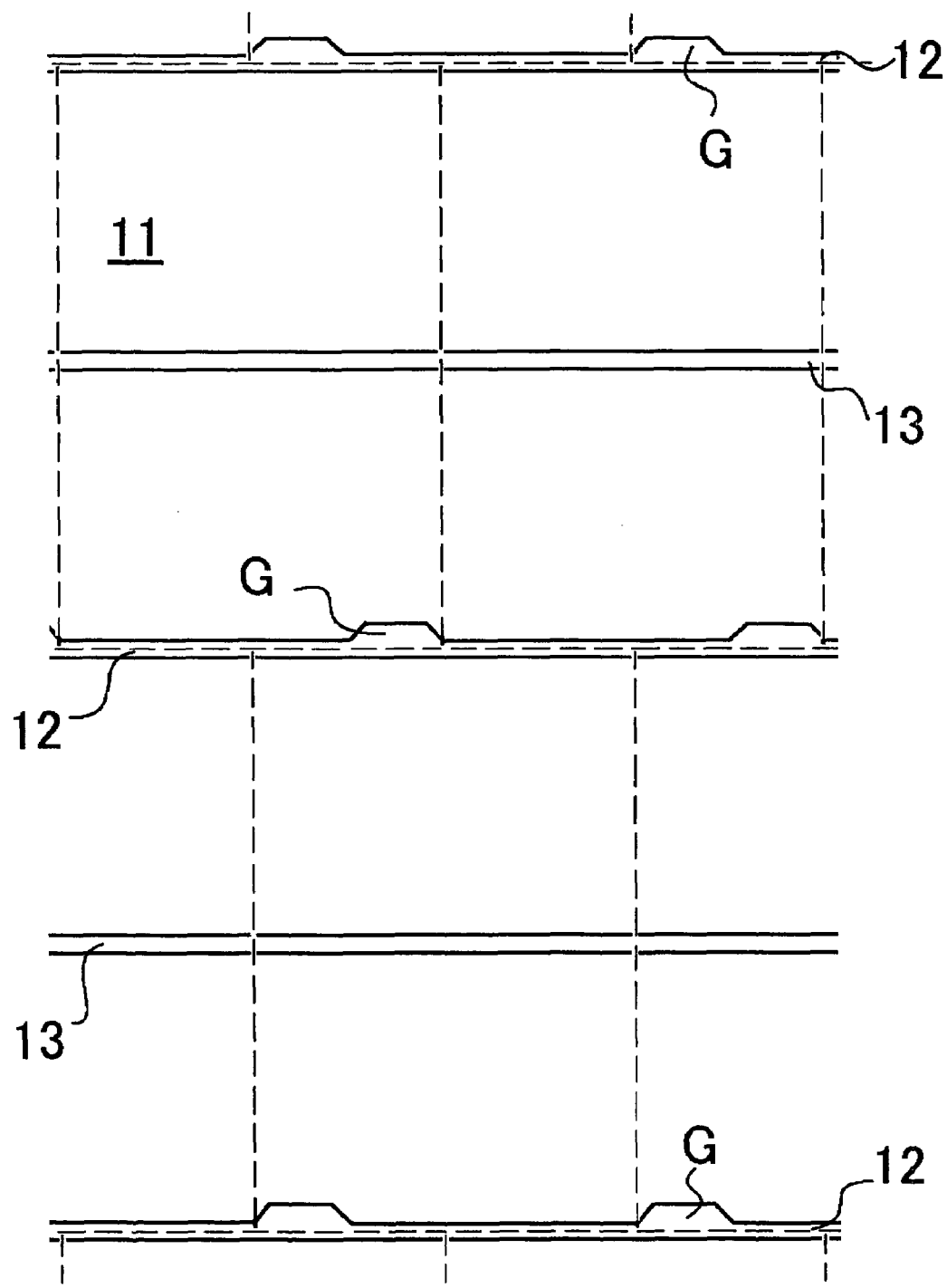
FIG. 1 is a diagram showing a pattern of scanning lines and common lines formed by a scanning line and common line forming process.
Figure 2:
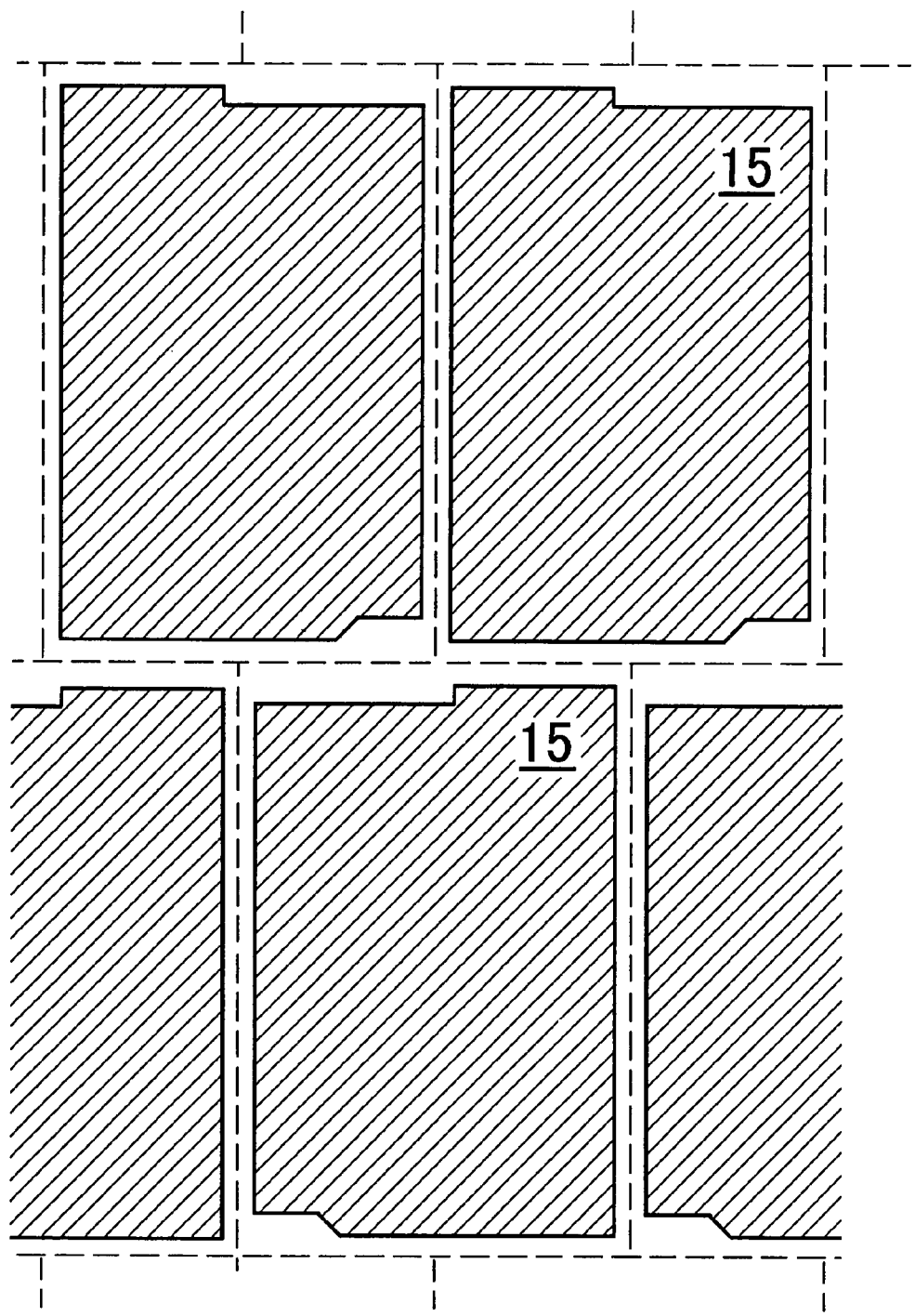
FIG. 2 is a diagram showing a pattern of common electrodes formed by a common electrode forming process.
Figure 3:
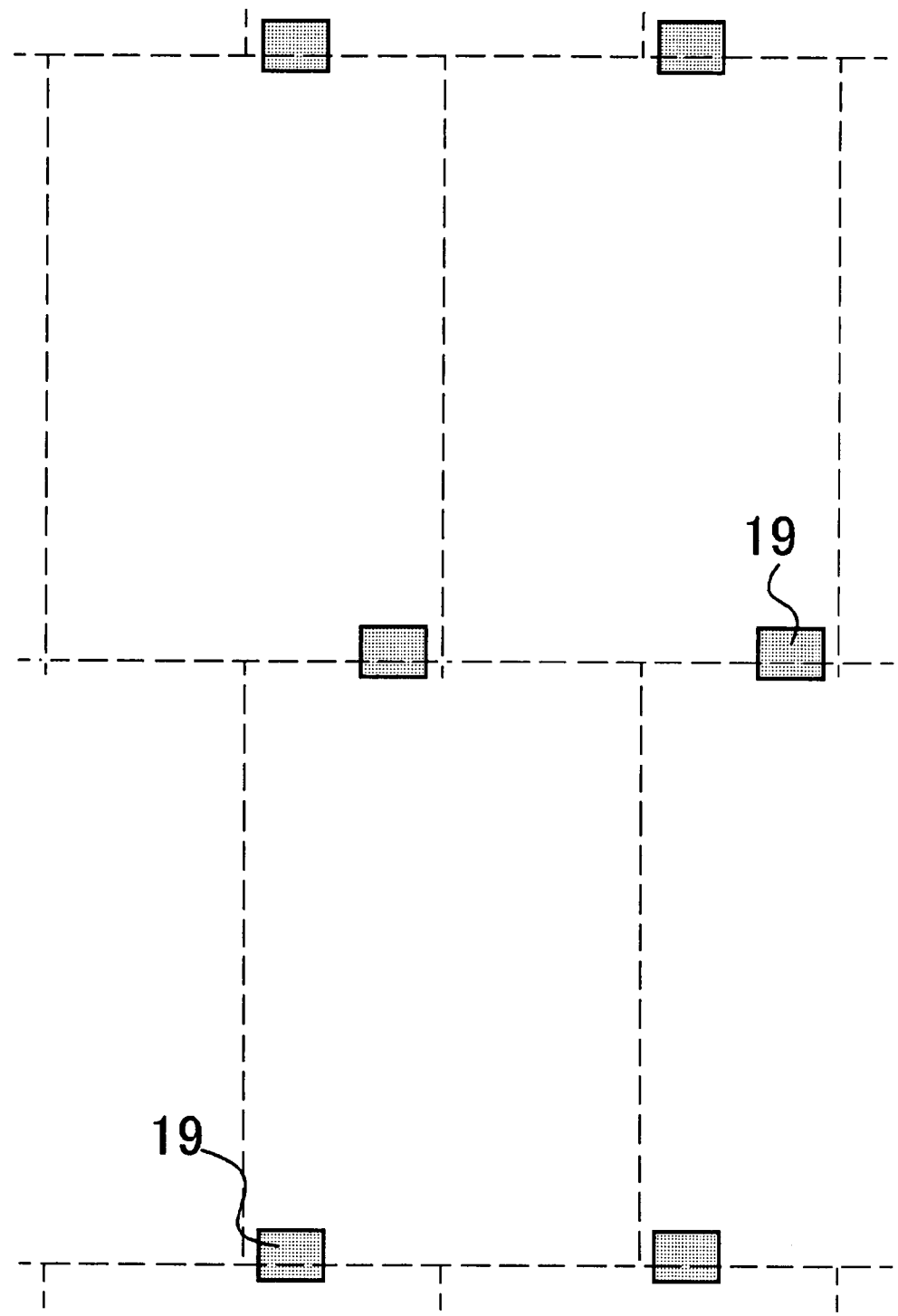
FIG. 3 is a diagram showing a pattern of semiconductor layers formed by a semiconductor layer forming process.
Figure 4:
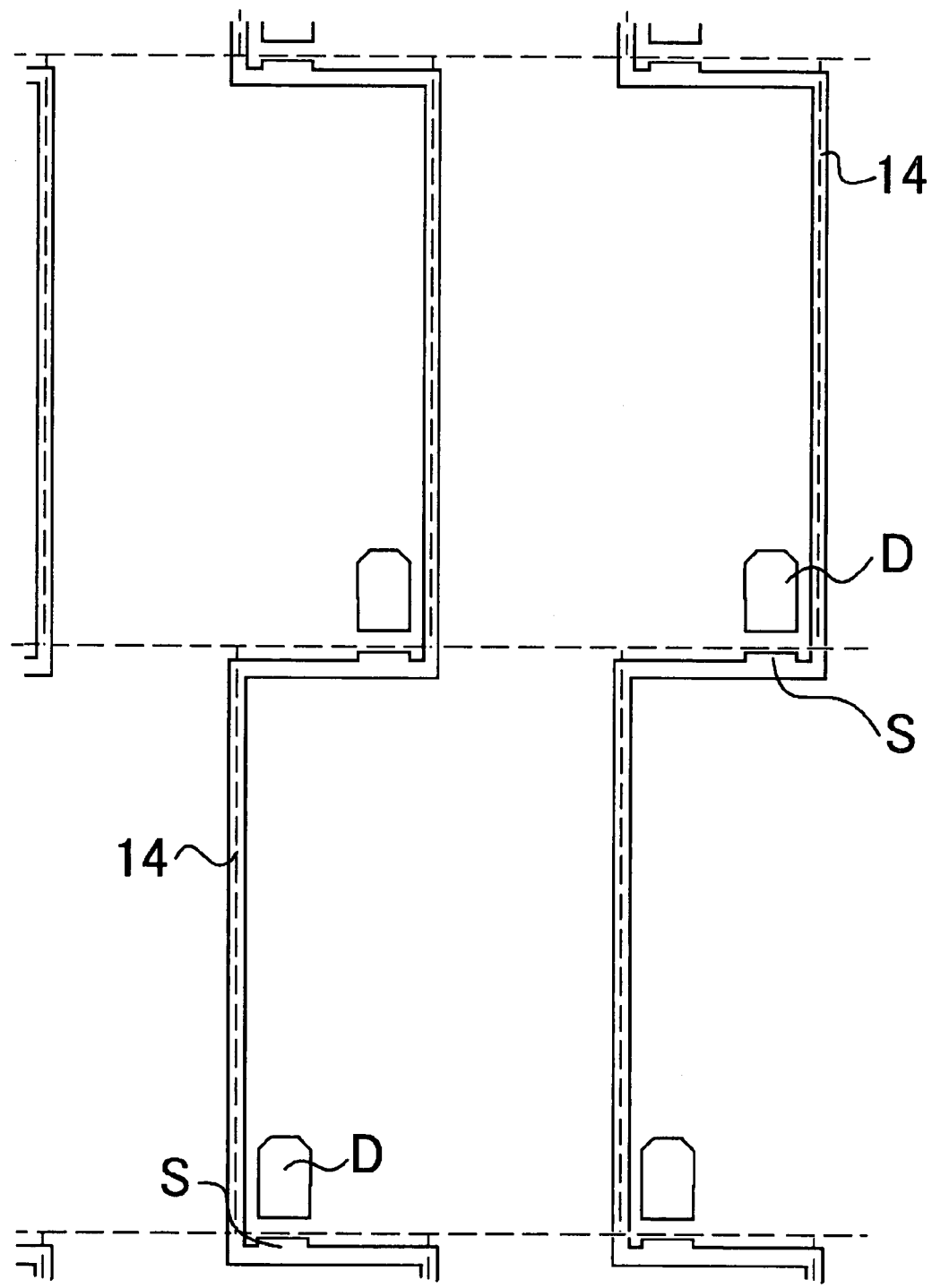
FIG. 4 is a diagram showing a pattern of signal lines and drain electrodes formed by a signal line and drain electrode forming process.
Figure 5:
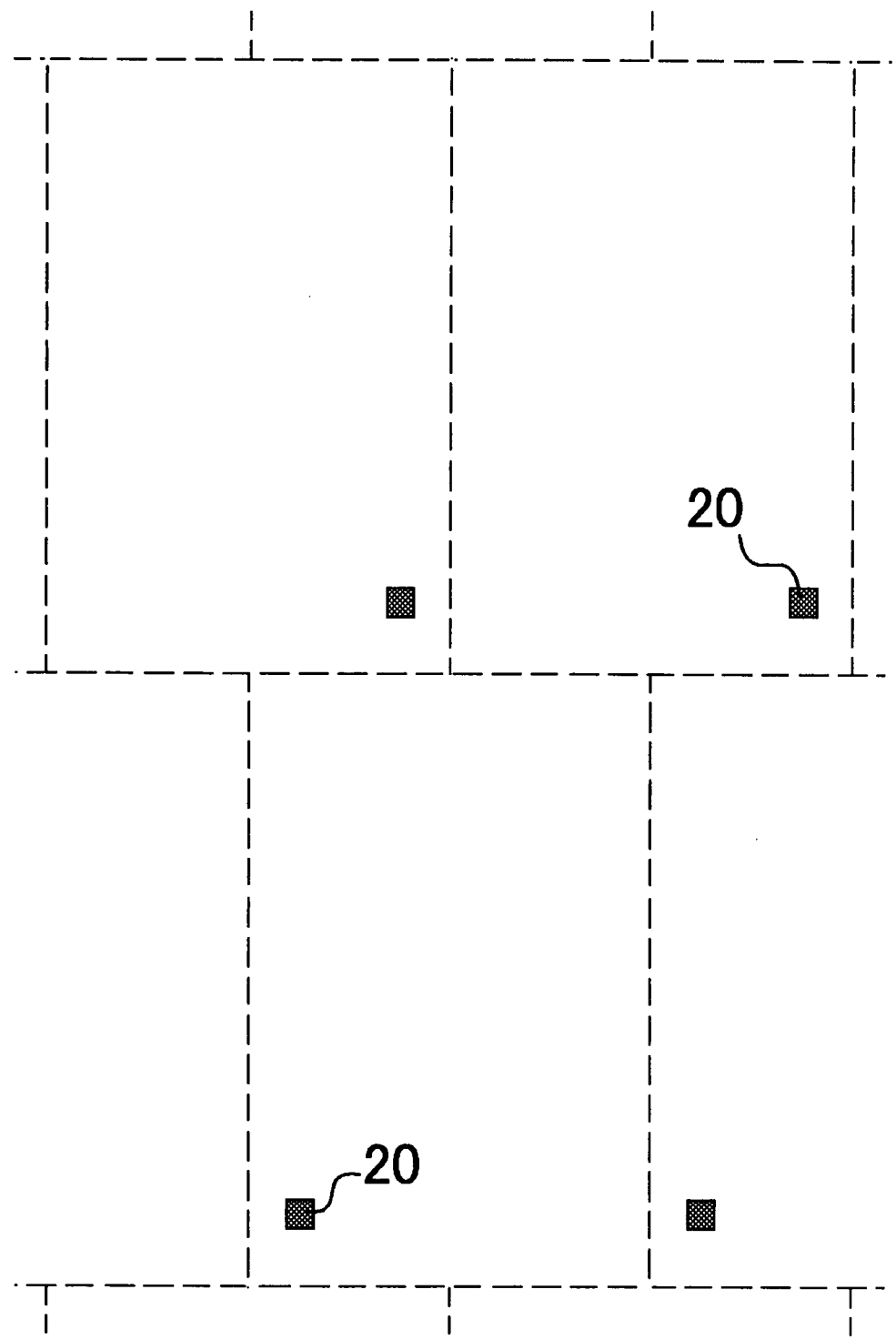
FIG. 5 is a diagram showing a pattern of contact holes formed by a contact hole forming process.
Figure 6:
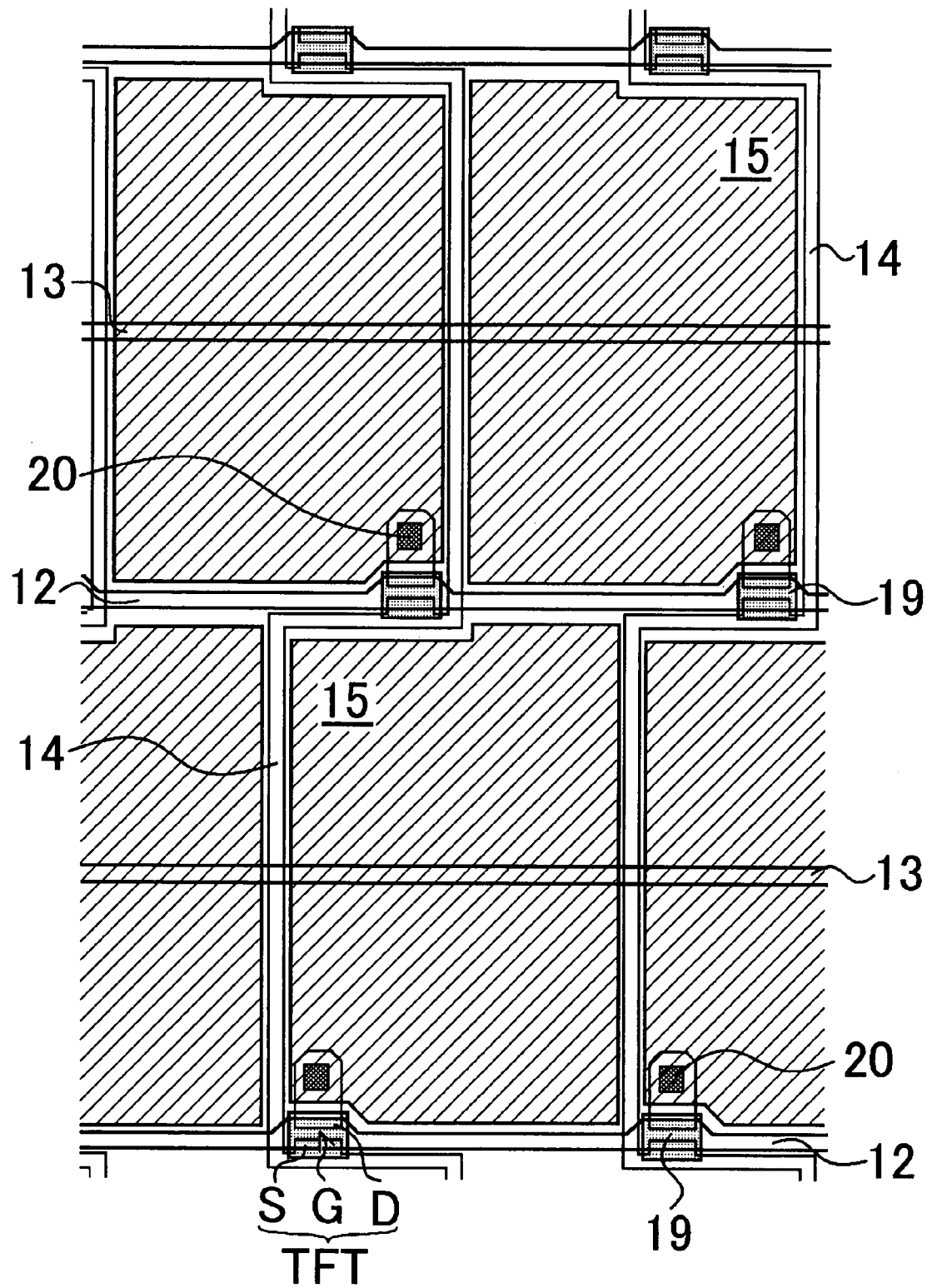
FIG. 6 is a plan view showing all the patterns of FIGS. 1 to 5 overlapping with each other without taking their vertical positional relationship into consideration.

FIG. 1 is a diagram showing a pattern of scanning lines and common lines formed by a scanning line and common line forming process. FIG. 2 is a diagram showing a pattern of common electrodes formed by a common electrode forming process. FIG. 3 is a diagram showing a pattern of semiconductor layers formed by a semiconductor forming process. FIG. 4 is a diagram showing a pattern of signal lines and drain electrodes formed by a signal line and drain electrode forming process. FIG. 5 is a diagram showing a pattern of contact holes formed by a contact hole forming process. FIG. 6 is a plan view showing all the patterns of FIGS. 1 to 5 overlapping with each other without taking their vertical positional relationship into consideration.

Figure 7:
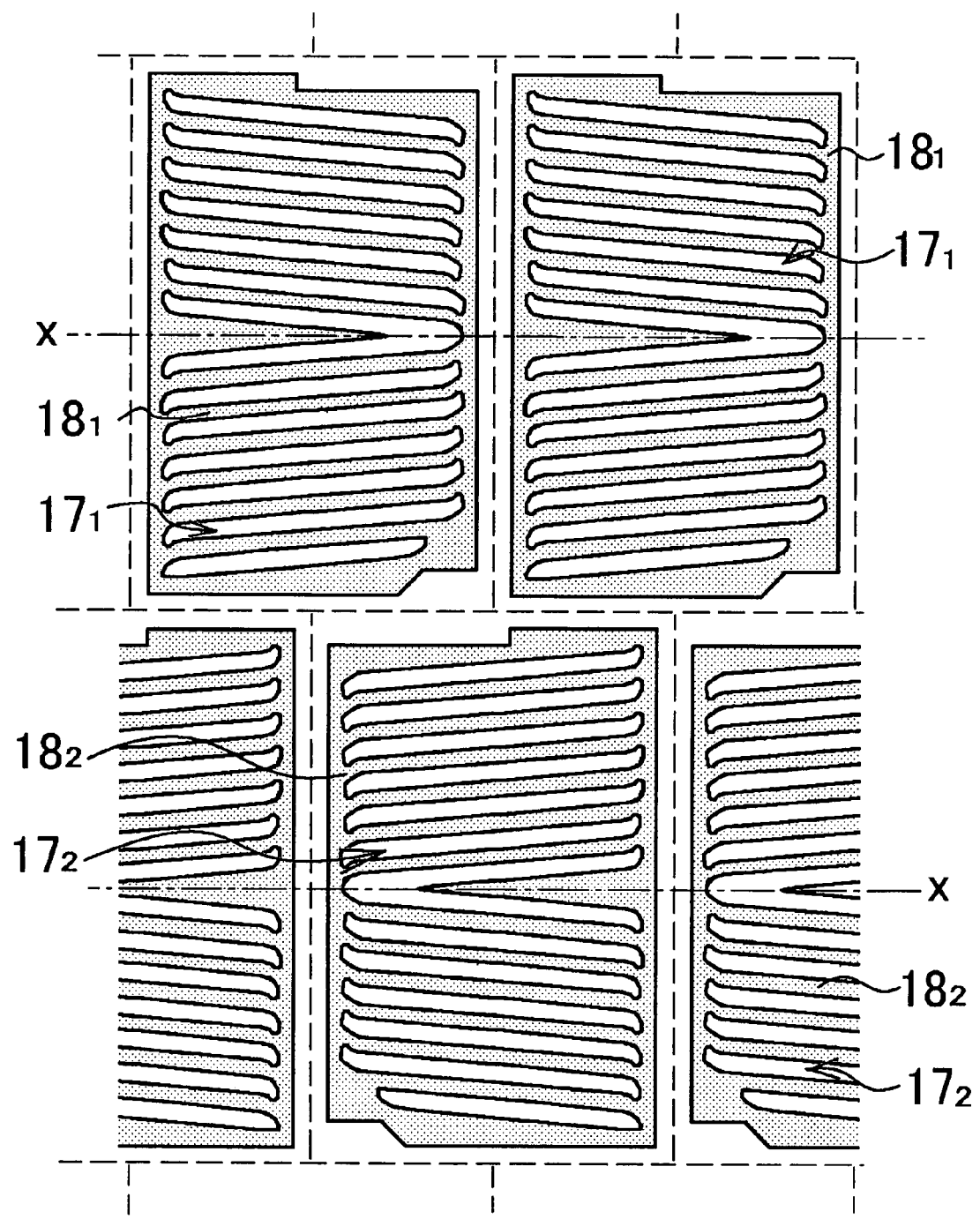
FIG. 7 is a diagram showing pixel electrodes formed by a pixel electrode forming process.
Figure 8:
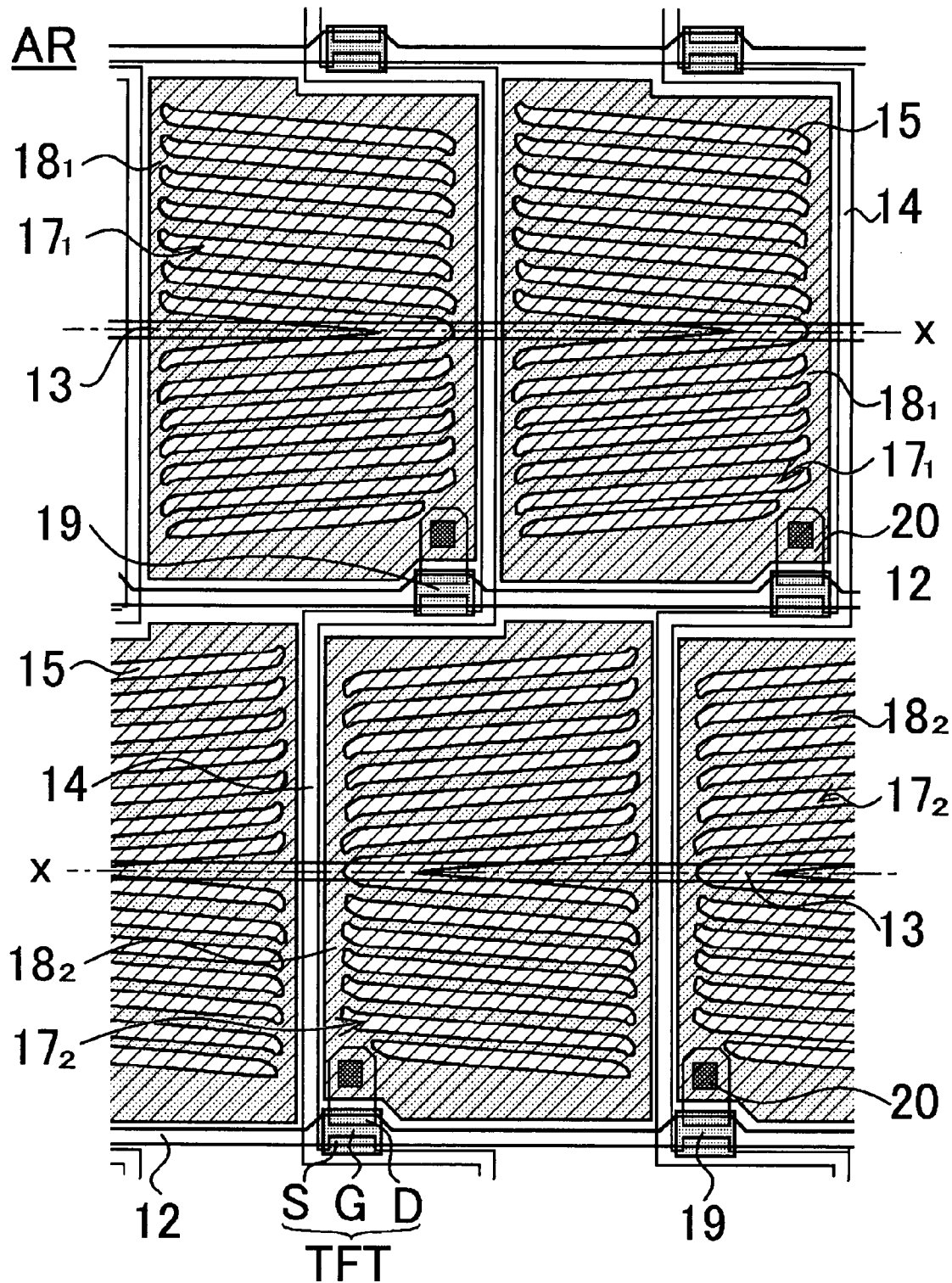
FIG. 8 is a plan view showing the patterns of FIGS. 6 and 7 overlapping with each other without taking their vertical positional relationship into consideration.
Figure 9:
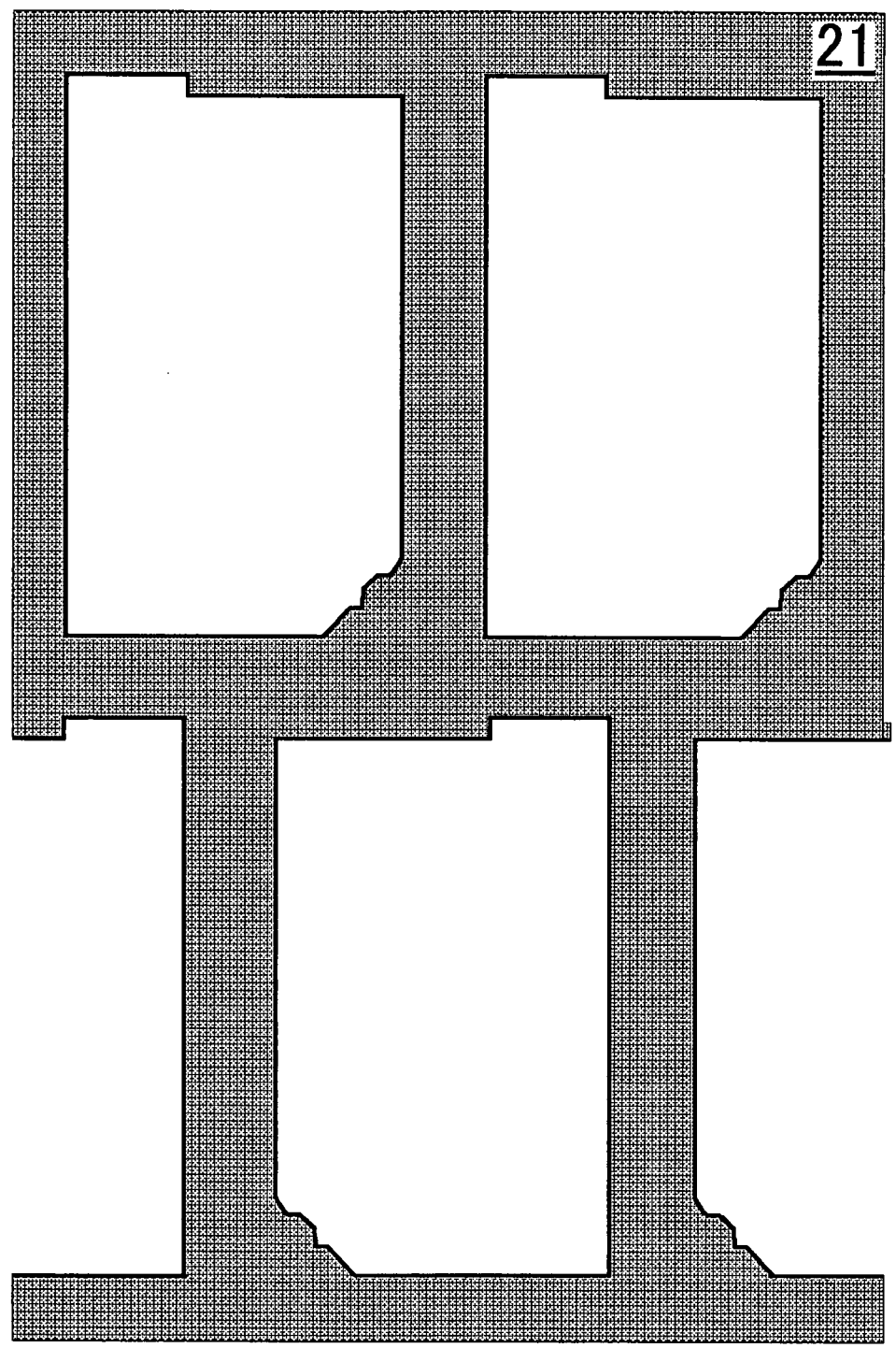
FIG. 9 is a diagram showing a pattern of a black matrix provided on a color filter substrate.
Figure 10:
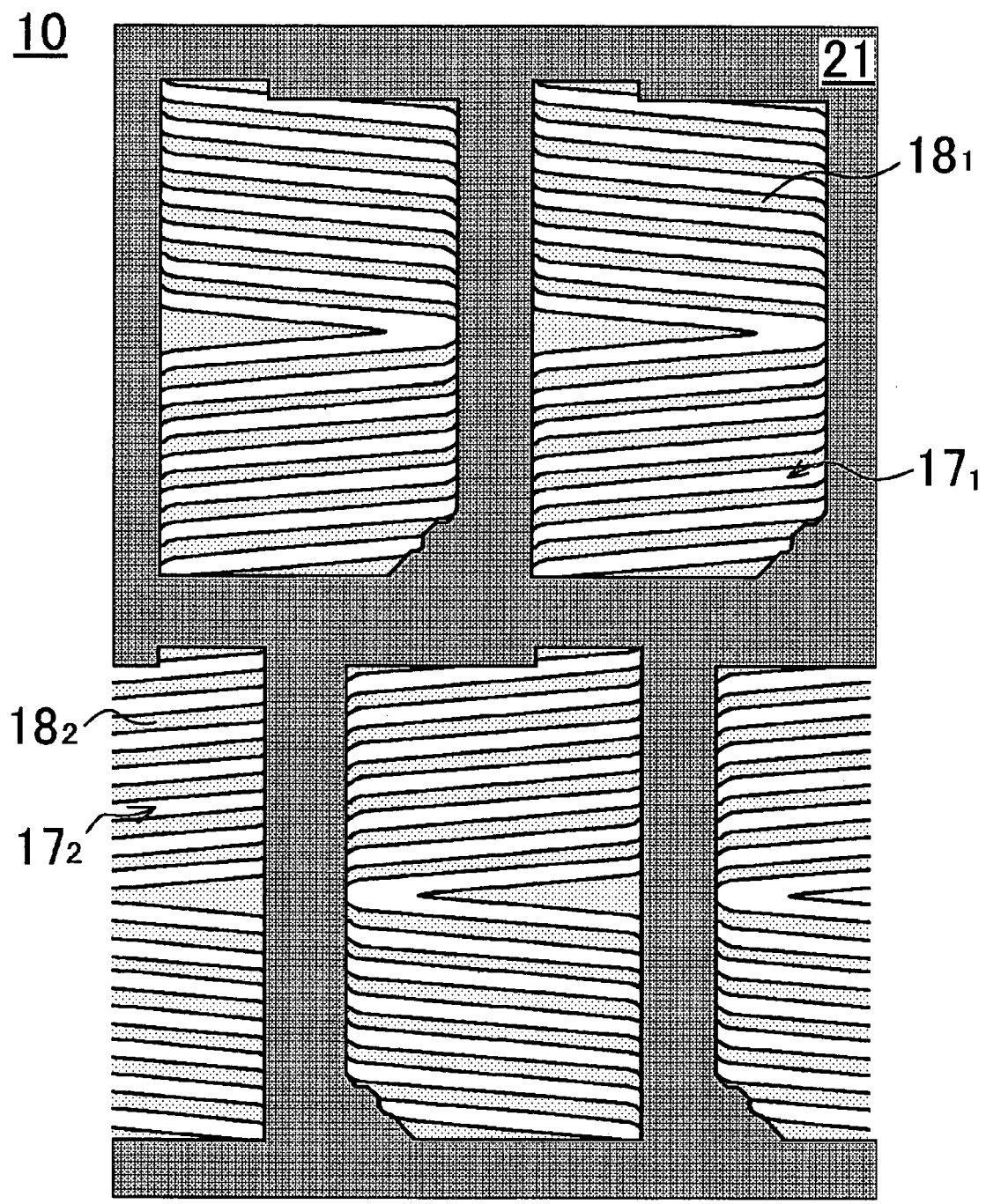
FIG. 10 is a diagram showing the pattern of FIG. 9 overlapped on the pattern of FIG. 7.
Figure 11:
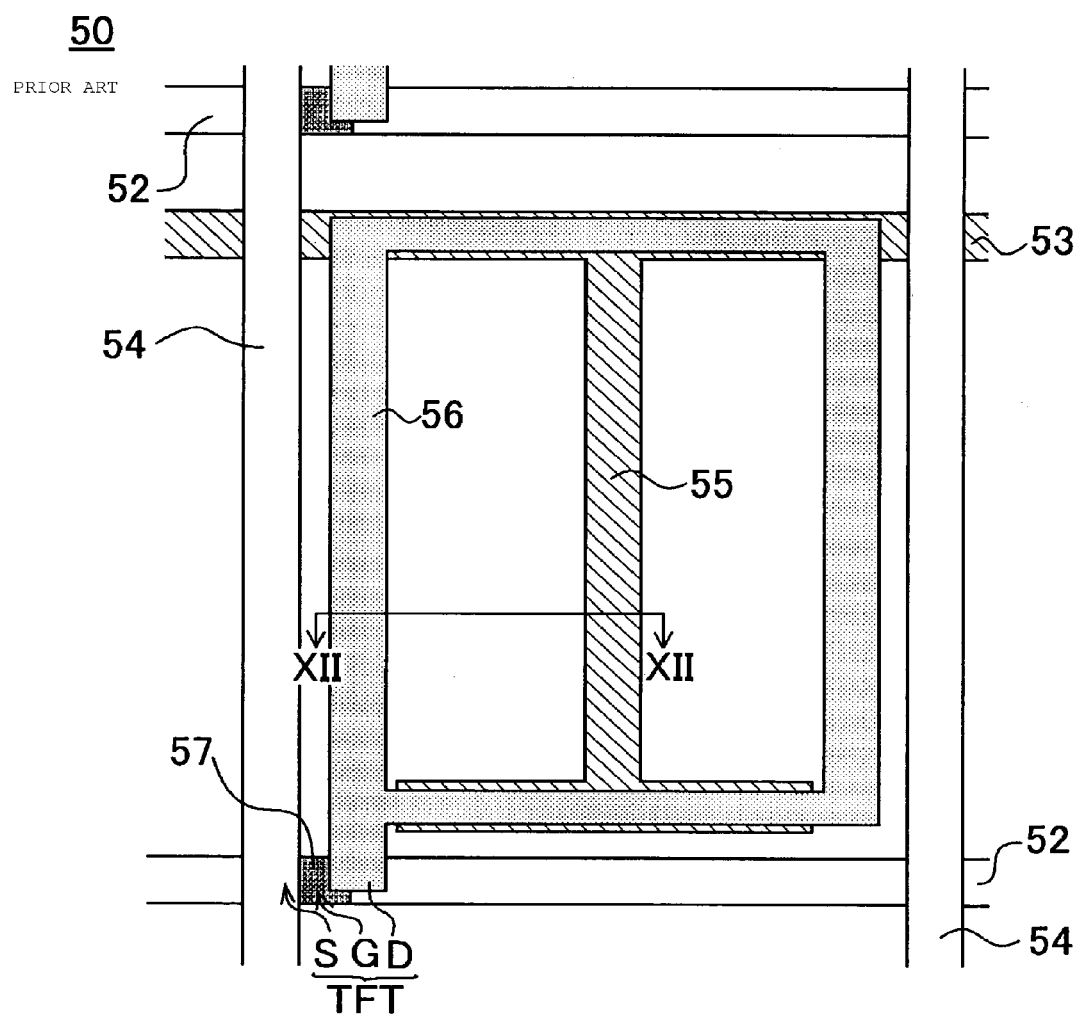
FIG. 11 is a schematic plan view of one pixel of an IPS mode LCD panel.
Figure 12:
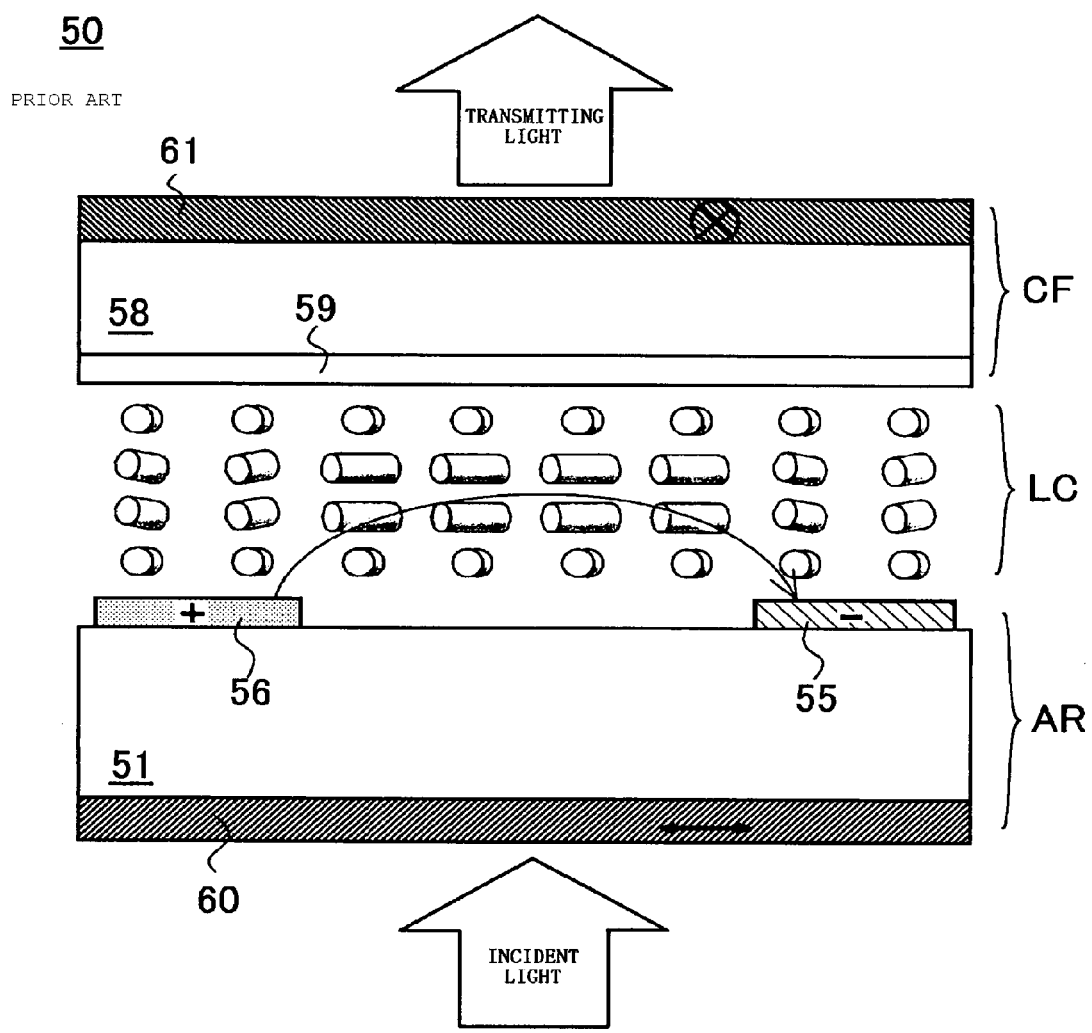
FIG. 12 is a schematic sectional view taken along the line XII-XII of FIG. 11.
Figure 13:
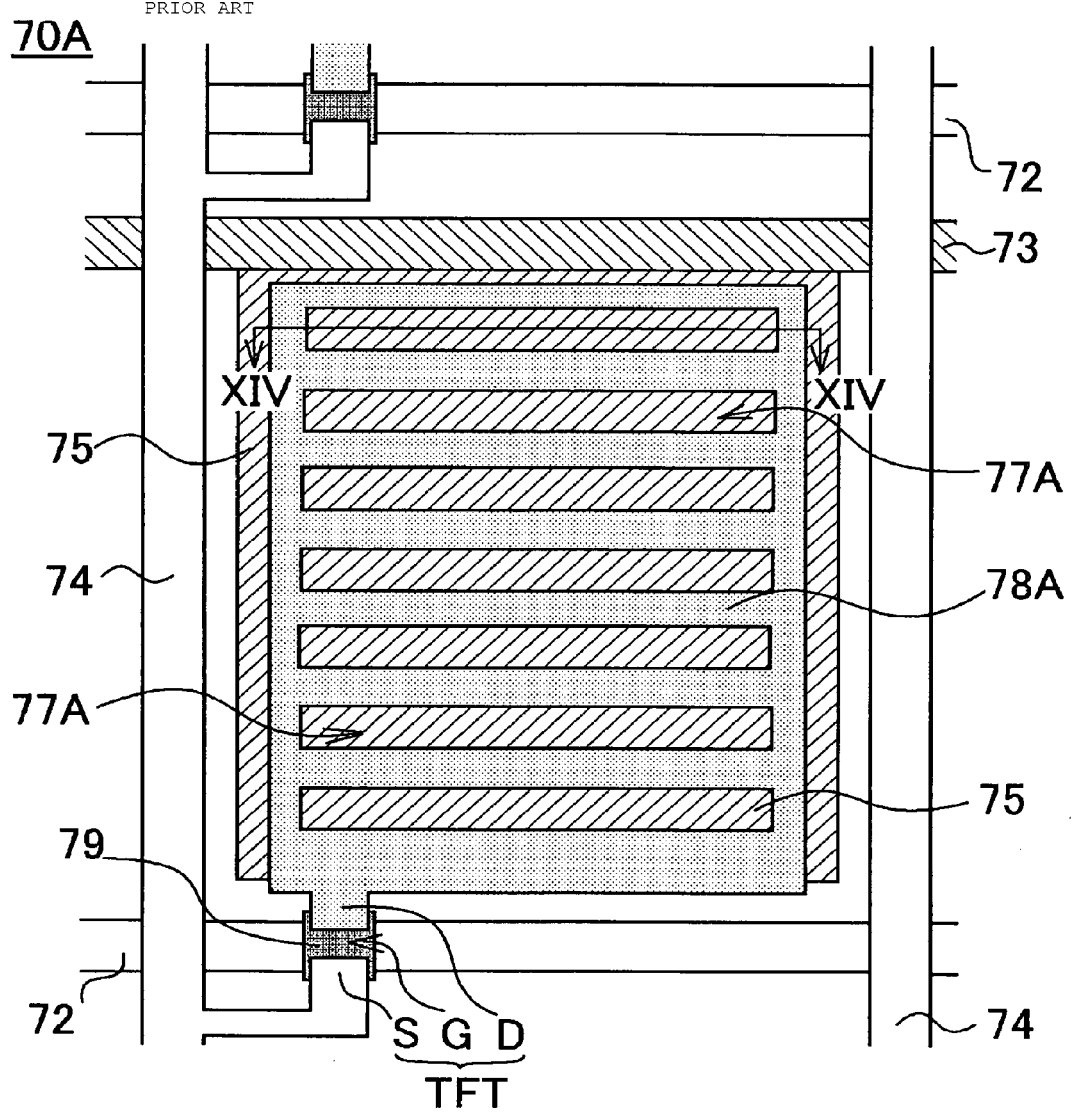
FIG. 13 is a schematic plan view of one pixel of an FFS mode LCD panel.
Figure 14:
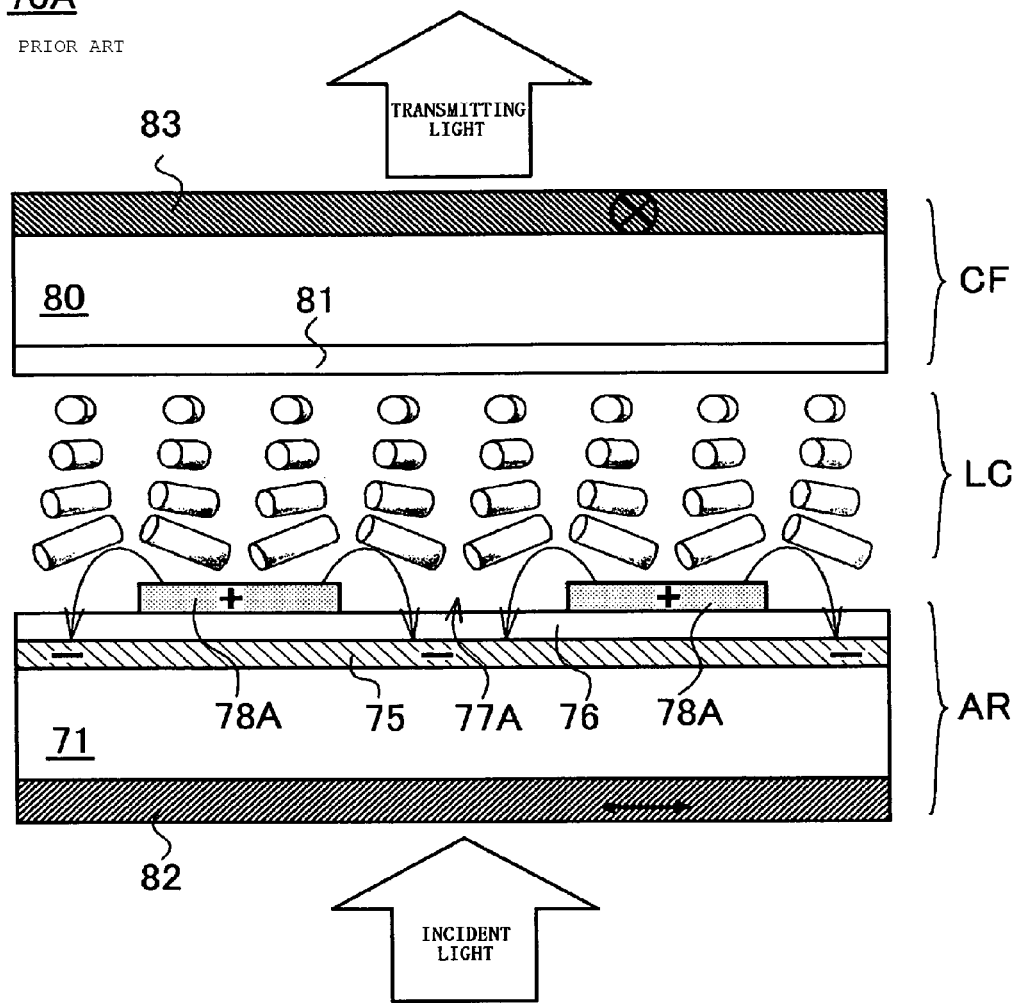
FIG. 14 is a schematic sectional view taken along the line XIV-XIV of FIG. 13.
Figure 15:
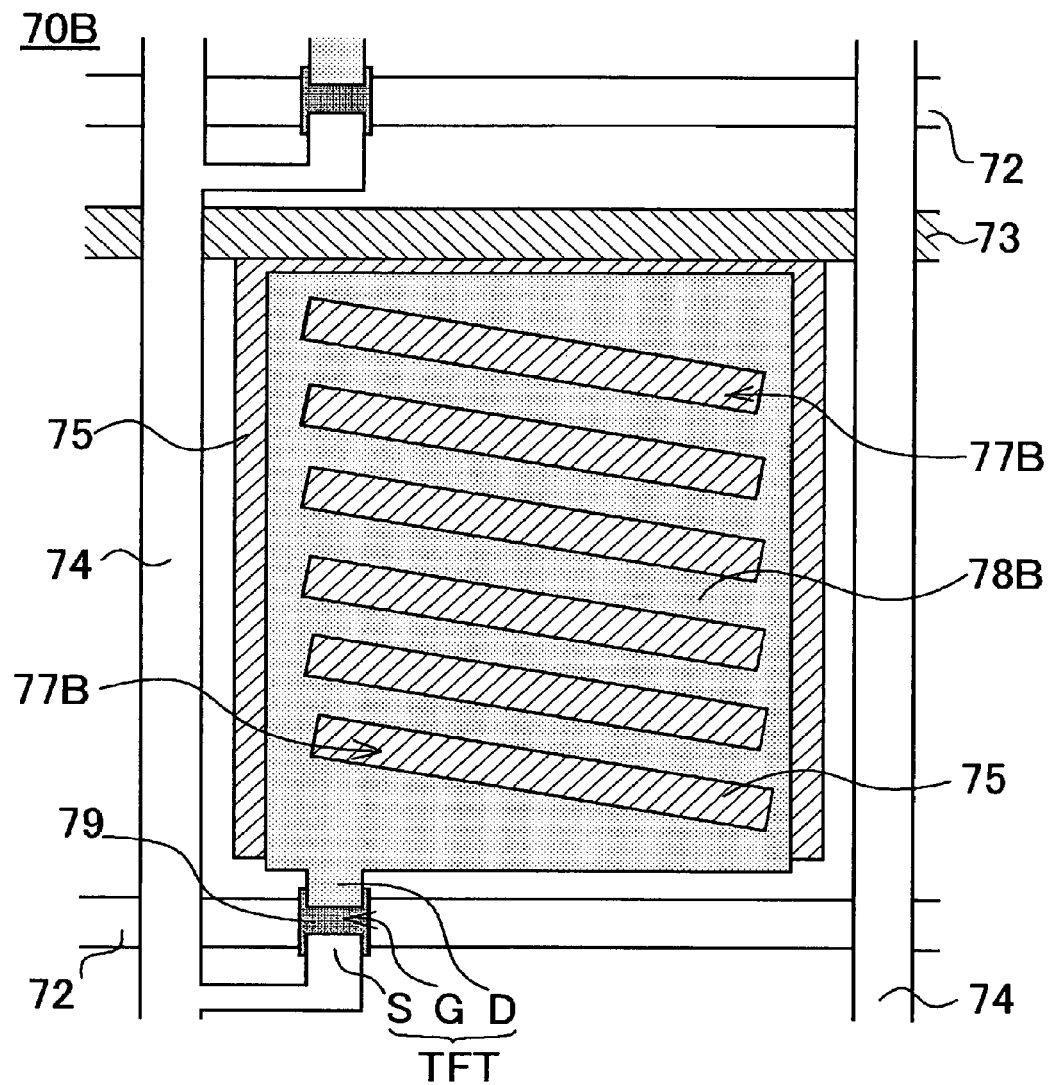
FIG. 15 is a plan view of one pixel of an FFS mode LCD panel with inclined slits.
Figure 16:
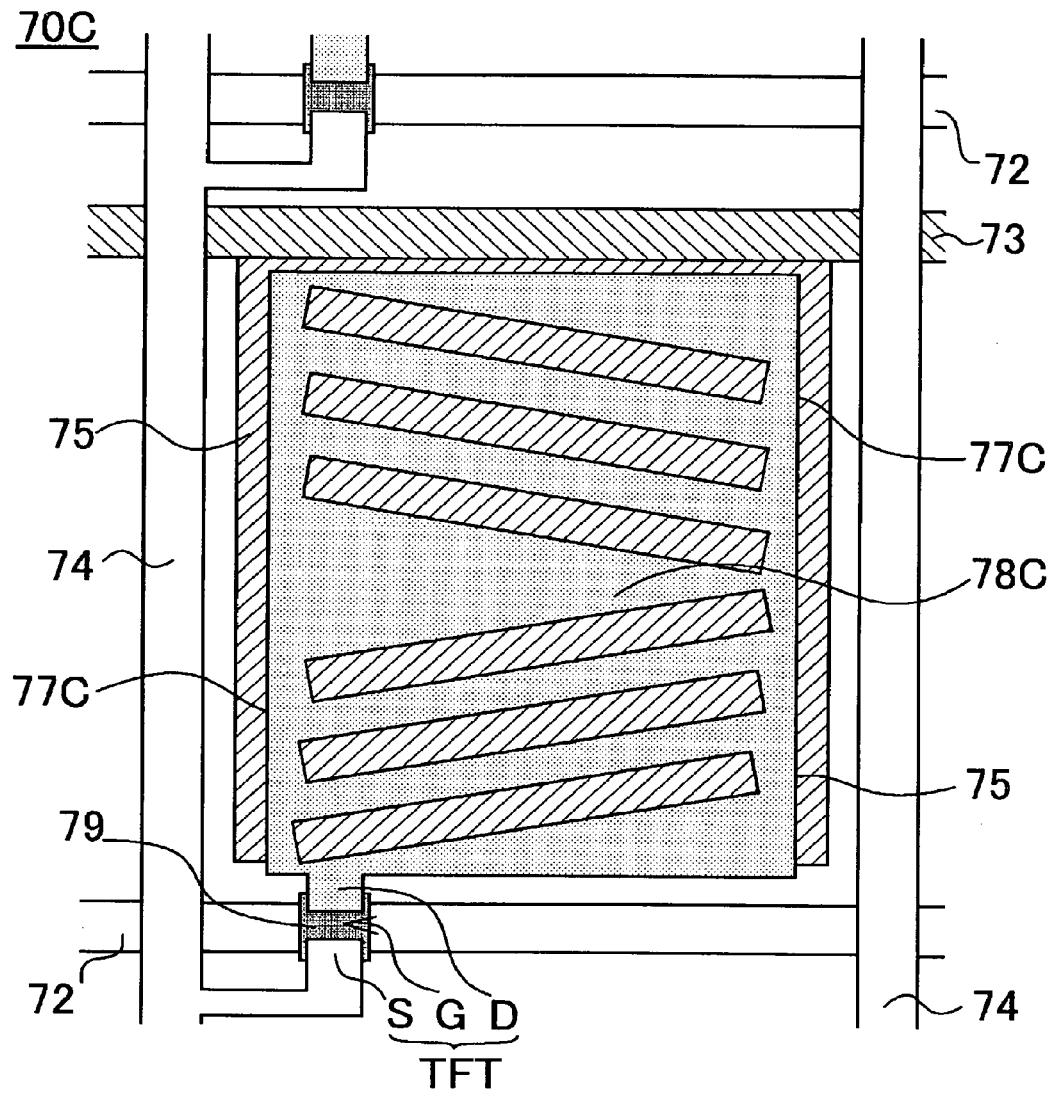
FIG. 16 is a plan view of one pixel of an FFS mode LCD panel in a dual-domain structure.
Figure 17:
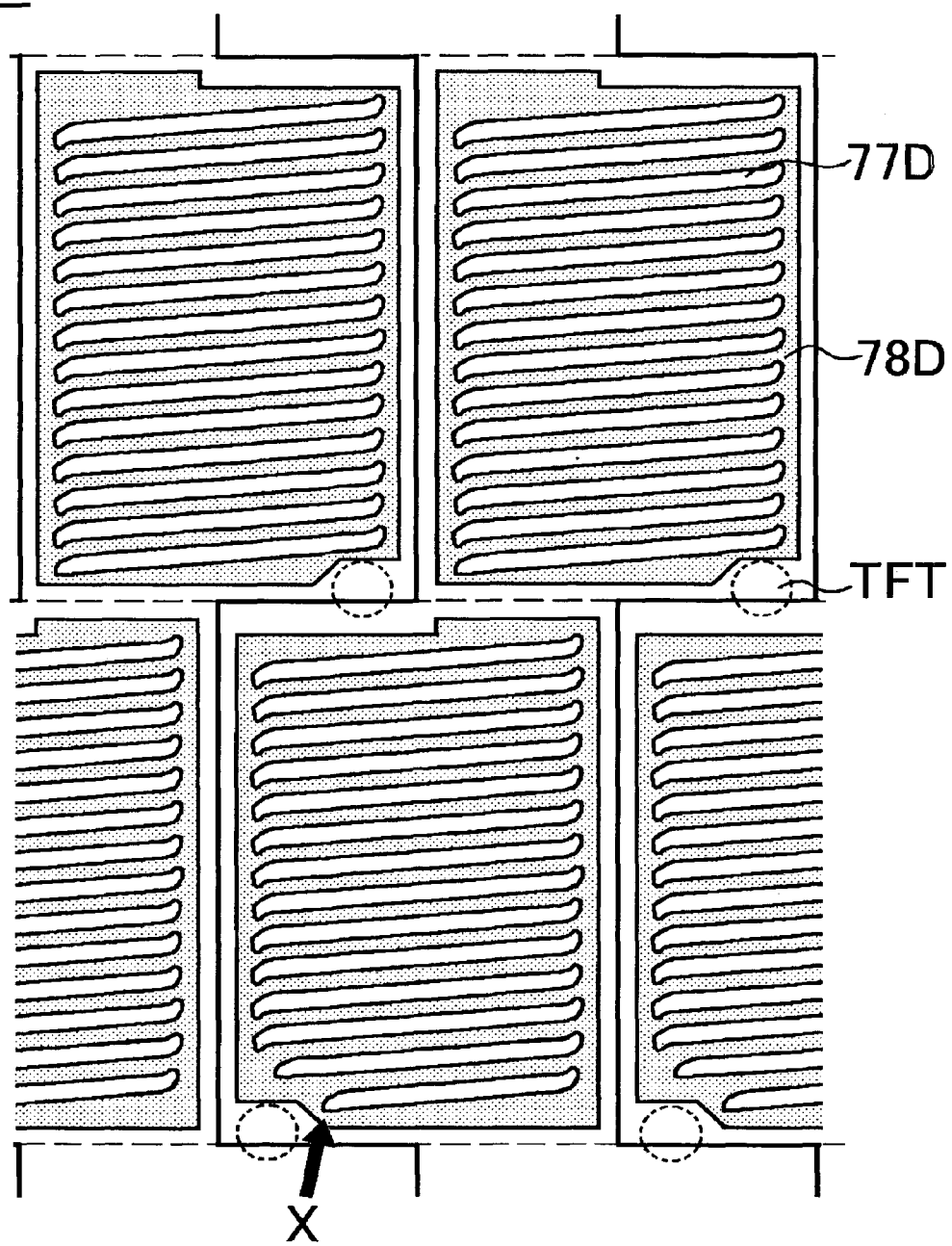
FIG. 17 is a schematic plan view of several pixels of an FFS mode LCD panel 70D in which pixels are provided in a delta arrangement.

FIG. 7 is a diagram showing a pattern of pixel electrodes formed by a pixel electrode forming process. FIG. 8 is a plan view of the patterns of FIGS. 6 and 7 overlapping with each other without taking their vertical positional relationship into consideration. FIG. 9 is a diagram showing a pattern of a black matrix provided on a color filter substrate. FIG. 10 is a diagram showing the pattern of FIG. 9 overlapped on the pattern of FIG. 7.

A manufacturing process of an FFS mode liquid crystal display (LCD) panel 10 of a first embodiment of the invention will be described in separated processes for manufacturing an array substrate and manufacturing a color filter substrate.

Array Substrate Manufacturing Process (1) Scanning Line and Common Line Forming Process First, a two-layered film whose lower part is made of Al metal and surface is made of Mo metal is deposited over an entire surface of a transparent substrate 11 such as a glass substrate. Then, using a photolithography technology and an etching technology, a plurality of scanning lines 12 and a plurality of common lines 13 each made of the Mo—Al two-layered film are formed in parallel with each other, as in a pattern shown in FIG. 1. Here, a part of each scanning line 12 is protruded to be a gate electrode G of each TFT. Each of the common lines 13 is provided between adjacent scanning lines 12. In FIG. 1, a broken line portion shows a boundary of each pixel (hereinafter, the same applies to other drawings).

(2) Common Electrode Forming Process

A transparent conductive layer made of ITO is deposited over an entire surface of the transparent substrate 11 with which the scanning line and common line forming process (1) has been carried out. Using the photolithography technology and the etching technology, common electrodes 15 are formed as in a pattern shown in FIG. 2. The common electrodes 15 are electrically connected to the common lines 13, but not connected to the scanning lines 12 or the gate electrodes G.

(3) Insulating Film Forming Process

An insulating film made of silicon nitride or silicon oxide is deposited over an entire surface of the transparent substrate 11 with which the common electrode forming process (2) has been carried out.

(4) Semiconductor Layer Forming Process

Using a chemical vapor deposition (CVD) method, an amorphous silicon (hereinafter, referred to as "a-Si") layer is deposited over an entire surface of the transparent substrate 11 with which the insulating film forming process (3) has been carried out. Using the photolithography technology and the etching technology, a semiconductor layer 19 made of a-Si layer is formed above each gate electrode G as in a pattern shown in FIG. 3.

(5) Signal Line and Drain Electrode Forming Process

A conductive layer having a three-layered structure of Mo—Al—Mo is deposited over an entire surface of the transparent substrate 11 with which the semiconductor layer forming process (4) has been carried out. Using the photolithography technology and the etching technology, signal lines 14 and drain electrodes D are formed as in a pattern shown in FIG. 4. Portions serving as the source electrode S and the drain electrode D included in the signal lines 14 overlap partially with the surface of the semiconductor layer 19.

(6) Passivation Film Forming Process

A passivation film made of silicon nitride is deposited over an entire surface of the transparent substrate 11 with which the signal line and drain electrode forming process (5) has been carried out.

(7) Contact Hole Forming Process

To the transparent substrate 11 with which the passivation film forming process (6) has been carried out, a contact hole 20 is formed at a predetermined position of the passivation film to expose a part of the drain electrode D, using the photolithography technology and the etching technology. FIG. 6 is a plan view of the transparent substrate 11 with which the contact hole forming process has been carried out perspectively without taking the vertical positional relationship of each layer into consideration.

(8) Pixel Electrode Forming Process

A transparent conductive layer made of ITO is deposited over an entire surface of the transparent substrate 11 with which the contact hole forming process (7) has been carried out. Using the photolithography technology and the etching technology, pixel electrodes $18_1$ of odd-numbered rows each having slits $17_1$ and pixel electrodes $18_2$ of even-numbered rows each having slits $17_2$ are formed in a pattern shown in FIG. 7. The pixel electrodes $18_1$ and $18_2$ are both electrically connected to the drain electrodes D via the contact holes 20. FIG. 8 is a plan view of the transparent substrate 11 with which the pixel electrode forming process has been carried out perspectively without taking the vertical positional relationship of each layer into consideration. By depositing a predetermined alignment layer (not shown) over an entire surface, the array substrate AR is completed. The shape and the like of the slits $17_1$ and $17_2$ provided to the pixel electrodes $18_1$ and $18_2$ are described later.

Color Filter Substrate Manufacturing Process

A color filter substrate is provided as follows. A layer of a black matrix material such as a photosensitive resin is deposited on an entire surface of a transparent substrate made of glass substrate and the like, which is not shown. Using a photolithography technology, a black matrix 21 having a pattern as shown in FIG. 9 is formed. A color filter layer of three primary colors of RGB, for example, is formed at a position corresponding to each pixel. Next, an overcoat layer is deposited on a surface of the color filter layer so as to planarize the surface. Then by forming a predetermined alignment layer on a surface of the overcoat layer and forming a spacer at a predetermined position, the color filter substrate is completed.

The array substrate AR is disposed to face the color filter substrate. By sealing the circumference with a sealing material and injecting a liquid crystal between both substrates, an FFS mode LCD panel 10 according to the embodiment is obtained. The dispositional relationship between the pixel electrodes $18_1$ and $18_2$ and the black matrix 21 of the FFS mode LCD panel according to the present embodiment is as shown in FIG. 10, when viewed from the side of the black matrix 21.

Hereinafter, the shape of slits $17_1$ and $17_2$ provided respectively at the pixel electrodes $18_1$ and $18_2$ of the FFS mode LCD panel 10 according to the present embodiment will be described with reference to FIGS. 7, 8 and 10. The plurality of slits $17_1$ provided to the pixel electrodes $18_1$ in odd-numbered rows are in a state that are inclined toward the upper left-hand side or the lower left-hand side with respect to an axis x (see FIGS. 7 and 8) which is parallel to the scanning lines 12. The axis x corresponds to a section where each common line 13 is positioned between adjacent scanning lines 12. The same number of slits are arranged in line symmetry with respect to the axis x. Similarly, the plurality of slits $17_2$ provided at the pixel electrodes $18_2$ in even-numbered rows are in a state that are inclined toward the upper right-hand side or the lower right-hand side with respect to an axis x. The same number of slits are arranged in line symmetry with respect to the axis x. In the FFS mode LCD panel 10 according to the present embodiment, all the pixel electrodes of the pixels are in symmetry with respect to the axis x parallel to the scanning lines 12 by each pixel electrode. This results in reducing viewing angle dependence in display quality in a direction perpendicular to the scanning lines 12. The number of slits provided on both sides of the axis x may be different from each other, but as there is no merit in making them different in numbers, it is preferable to provide the same number in order to secure the symmetrical viewing angle.

In the FFS mode LCD panel 10 according to the present embodiment, the plurality of slits $17_1$ provided at the pixel electrodes $18_1$ in odd-numbered rows and the plurality of slits $17_2$ provided at the pixel electrodes $18_2$ in even-numbered rows are inverted to each other with respect to the axis perpendicular to the scanning lines 12. This means that the pixel electrodes $18_2$ in the even-numbered rows can be manufactured by inverting (turn over) a manufacturing mask of the pixel electrodes $18_1$ in the odd-numbered rows. Therefore, with the FFS mode LCD panel 10 according to the present embodiment, each row is in symmetry with respect to the axis perpendicular to the scanning lines, thereby reducing the viewing angle dependence in display quality also in a direction along the scanning lines 12. In the FFS mode LCD panel 10 according to the present embodiment, the symmetrical viewing angle is maintained in directions both perpendicular to the scanning lines and along the scanning lines, utilizing a display opening. No spots are generated in a transverse direction as in the related art. Therefore, the FFS mode LCD panel with a bright display can be obtained.

In the FFS mode LCD panel 10 according to the present embodiment, the common lines 13 are made of a Mo—Al two-layered wiring which is the same material as the scanning lines 12, thereby shielding light. The ends of slits that are on both sides and closest to the axis x parallel to the scanning lines 12 are coupled on the axis x, in other words, above the common lines 13, and the slits form a V shape. As inclination directions of the slits that are on both sides and closest to the axis x parallel to the scanning line 12 are different, alignment directions from the axis x of liquid crystal molecules are different. Therefore, although a disclination is generated along the axis x, a portion where the disclination appears is shielded from light by the common lines 13. As the generated disclination is difficult to view from outside, the display quality improves.

The invention claimed is:

1. A fringe field switching mode liquid crystal display panel comprising:

a plurality of scanning lines and common lines provided in parallel;

a plurality of signal lines provided in a crank manner in a direction perpendicular to said scanning lines;

a plurality of pixel electrodes each formed between said plurality of scanning lines and signal lines in a delta arrangement, each of said plurality of pixel electrodes including portions defining a plurality of slits inclined in different directions to each other with respect to an axis parallel to said scanning lines and positioned adjacent scanning lines; and a plurality of drain electrodes, each of the plurality of drain electrodes connected to a respective pixel electrode, and each of the plurality of drain electrodes having three sides facing a respective signal line provided in the crank manner, wherein for each pixel electrode in an odd-numbered row, a slit above a respective common electrode and nearest to a respective drain electrode is inclined in a first direction, wherein for each pixel electrode in an even-numbered row, a slit above a respective common electrode and nearest to a respective drain electrode is declined in the first direction, wherein slits included in the pixel electrodes in the odd-numbered rows between a pair of adjacent common lines and slits included in the pixel electrodes in the even-numbered rows between the pair of adjacent common lines are inclined in a same direction, and wherein the plurality of common lines are positioned at the portion where the first slits inclined in a, the first direction and the second slits inclined in a second direction are adjacent to each other in the pixel electrodes aligned in parallel with the scan lines, respectively, and wherein an area between two adjacent common lines comprises both a part of the plurality of slits included in the pixel electrodes in the odd-numbered row and a part of the plurality of slits included in the pixel electrodes in the even-numbered row adjacent the odd-numbered row.

2. The fringe field switching mode liquid crystal display panel according to claim 1, wherein said slits provided at both sides of said axis parallel to said scanning lines are same in number on both sides.

3. The fringe field switching mode liquid crystal display panel according to claim 1, wherein said common lines are provided under said pixel electrodes with respect to said axis parallel to said scanning lines.

4. The fringe field switching mode liquid crystal display panel according to claim 1, wherein ends of said slits that are on both sides of and closest to said axis parallel to said scanning lines are coupled on said axis parallel to said scanning lines.

5. The fringe field switching mode liquid crystal display panel according to claim 1, wherein all slits included in the pixel electrodes in the odd-numbered rows between a pair of adjacent common lines and all slits included in the pixel electrodes in the even-numbered rows between the pair of adjacent common lines are all inclined in a same direction.

6. The fringe field switching mode liquid crystal display panel according to claim 1, wherein drain electrodes in the even-numbered rows are positioned differently than drain electrodes in the odd-numbered rows.

7. The fringe field switching mode liquid crystal display panel according to claim 6, wherein among said pixel electrodes, pixel electrodes in the odd-numbered rows and pixel electrodes in the even-numbered rows are inverted to each other with respect to an axis perpendicular to said common lines, and each of the pixel electrodes in the same row is in symmetry with each other with respect to the axis perpendicular to said common lines.

8. The fringe field switching mode liquid crystal display panel according to claim 1, wherein each of the plurality of drain electrodes extends outside of the respective common electrode in the direction perpendicular to said scanning lines.

9. The fringe field switching mode liquid crystal display panel according to claim 1, wherein each of the plurality of drain electrodes has a first side connected to a gate electrode and facing the respective signal line, and has a second side, opposite the first side in the direction perpendicular to the scanning lines, facing an end of a slit in a respective pixel electrode.

10. The fringe field switching mode liquid crystal display panel according to claim 9, wherein for each drain electrode in the odd-numbered row, the second side faces the slit inclined in the first direction, and for each drain electrode in the even-numbered row, the second side faces the slit declined in the first direction.

* * * * *